United States Patent
Teletzke et al.

(10) Patent No.: US 9,644,134 B2
(45) Date of Patent: May 9, 2017

(54) METHODS FOR IMPROVING THE SWEEP EFFICIENCY OF GAS INJECTION

(71) Applicants: Gary F. Teletzke, Sugar Land, TX (US); Jasper L. Dickson, Houston, TX (US); Preeti Kamakoti, Summit, NJ (US); Stuart R. Keller, Houston, TX (US); William B. Maze, Houston, TX (US); Peter G. Smith, Jr., Houston, TX (US); Yitian Xiao, Sugar Land, TX (US)

(72) Inventors: Gary F. Teletzke, Sugar Land, TX (US); Jasper L. Dickson, Houston, TX (US); Preeti Kamakoti, Summit, NJ (US); Stuart R. Keller, Houston, TX (US); William B. Maze, Houston, TX (US); Peter G. Smith, Jr., Houston, TX (US); Yitian Xiao, Sugar Land, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 448 days.

(21) Appl. No.: 14/167,892

(22) Filed: Jan. 29, 2014

(65) Prior Publication Data

US 2014/0262255 A1    Sep. 18, 2014

Related U.S. Application Data

(60) Provisional application No. 61/780,058, filed on Mar. 13, 2013.

(51) Int. Cl.
*E21B 43/16*    (2006.01)
*C09K 8/508*    (2006.01)
(Continued)

(52) U.S. Cl.
CPC ............ *C09K 8/508* (2013.01); *C09K 8/5045* (2013.01); *C09K 8/516* (2013.01); *C09K 8/594* (2013.01);
(Continued)

(58) Field of Classification Search
CPC ...... E21B 43/64; E21B 43/166; E21B 43/164; C09K 8/594; C09K 8/516; C09K 2208/10;
(Continued)

(56) References Cited

U.S. PATENT DOCUMENTS

| 4,495,995 A | 1/1985 | Chen et al. |
| 4,694,906 A | 9/1987 | Hutchins et al. |

(Continued)

FOREIGN PATENT DOCUMENTS

EP    188856    7/1986

OTHER PUBLICATIONS

Cai, X., et al., (2009) "Synthesis of Silica Powders by Pressured Carbonation," Chemical Engineering Journal, 151, pp. 380-386.
(Continued)

*Primary Examiner* — Daniel P Stephenson
(74) *Attorney, Agent, or Firm* — ExxonMobil Upstream Research Company Law Dept.

(57) ABSTRACT

A method for recovering oil from a subterranean, hydrocarbon-bearing formation includes at least one injection well and injecting a carrier fluid including a diverting agent into a high permeability pathway within the formation. An activating fluid is injected into the high permeability pathway within the formation, resulting in the precipitation or swelling of the diverting agent. The permeability of the high permeability pathway is decreased within the formation containing the diverting agent to a permeability less than the permeability of the adjacent areas of the formation. A
(Continued)

mineralization fluid may be injected that is oversaturated or becomes oversaturated upon interacting with the acid gas that causes mineral precipitation to seal off high-permeability pathways.

17 Claims, 3 Drawing Sheets

(51) Int. Cl.
C09K 8/594 (2006.01)
C09K 8/504 (2006.01)
C09K 8/516 (2006.01)

(52) U.S. Cl.
CPC .......... *E21B 43/164* (2013.01); *E21B 43/166* (2013.01); *C09K 2208/10* (2013.01); *Y02P 90/70* (2015.11)

(58) Field of Classification Search
CPC ... C09K 2208/18; C09K 8/5045; C09K 8/508
See application file for complete search history.

(56) References Cited

U.S. PATENT DOCUMENTS

| | | | |
|---|---|---|---|
| 4,921,576 A | 5/1990 | Hurd | |
| 4,941,533 A | 7/1990 | Buller et al. | |
| 5,244,936 A | 9/1993 | Mitchell | |
| 5,834,406 A * | 11/1998 | Sydansk | C09K 8/512 166/295 |
| 6,024,167 A | 2/2000 | Irani | |
| 6,435,277 B1 * | 8/2002 | Qu | C09K 8/68 166/281 |
| 6,454,003 B1 | 9/2002 | Chang et al. | |
| 2006/0124302 A1 * | 6/2006 | Gupta | C09K 8/516 166/279 |
| 2008/0108524 A1 * | 5/2008 | Willberg | C09K 8/035 507/225 |
| 2009/0118144 A1 * | 5/2009 | Hinkel | E21B 43/32 507/203 |
| 2013/0292120 A1 * | 11/2013 | Patil | E21B 33/13 166/293 |
| 2014/0262255 A1 * | 9/2014 | Teletzke | C09K 8/594 166/270 |
| 2015/0330197 A1 * | 11/2015 | Brannon | E21B 43/25 166/300 |

OTHER PUBLICATIONS

Frampton, H., et al. (2004) "Development of a Novel Waterflood Conformance Control System", SPE 89391, 2004.

Huh, C et al. (2008) "Use of Nanoparticles to 'Illuminate' Oil in Reservoir Rock" presentation package, Jun. 2008.

Otake, K et al. (1997) "Swelling of Polystyrene Latex Particles in Water by High-Pressure Carbon Dioxide," Langmuir 13, pp. 3047-3051.

Xiao, Y et al. (2009) "The Effects of Gas-Fluid-Rock Interactions on CO2 Injection and Storage: Insights from Reactive Transport Modeling" published in Proceedings of the 9$^{th}$ International Conference on Greenhouse Gas Technologies, Energy Procedia I (2009), pp. 1783-1790.

Zhang, J., et al., (2005) "A Simple and Inexpensive Route to Synthesize Porous Silica Microflowers by Supercritical $CO_2$," Microporous and Mesoporous Materials 87, pp. 10-14.

Zhang, T., et al., (2011) "Engineered Nanoparticles as Harsh-Condition Emulsion and Foam Stabilizers and as Novel Sensors," OTC 21212 presented at the Offshore Technology Conference, Houston, TX, May 2-5, 2011.

\* cited by examiner

METHODS FOR IMPROVING THE SWEEP EFFICIENCY OF GAS INJECTION

CROSS-REFERENCE TO RELATED APPLICATION

This application claims the priority benefit of U.S. Provisional Patent Application 61/780,058 filed Mar. 13, 2013 entitled METHODS FOR IMPROVING THE SWEEP EFFICIENCY OF GAS INJECTION, the entirety of which is incorporated by reference herein.

FIELD OF THE INVENTION

Embodiments of the invention relate to methods for enhancing the recovering of oil from a subsurface reservoir using gas injection. More particularly, embodiments of the invention relate to methods for enhancing the recovering of oil from subsurface reservoirs by improving the sweep efficiency of gas injection.

BACKGROUND

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

Only a portion of the oil originally present in a subterranean oil-bearing formation is recovered during the primary production cycle of the oil. A significant fraction of the oil-in-place is left in the ground after primary recovery. Water injection, sometimes referred to as waterflooding, and gas injection, sometimes referred to as gas flooding, are used as enhanced oil recovery (EOR) processes to recover the remaining oil. Water and gas are commonly injected alternately in a process referred to as water-alternating-gas (WAG) flooding.

The terms "gas injection" and "gas flooding" typically refer to an oil recovery process in which the fluid injected is a hydrocarbon gas, inert gas, carbon dioxide, acid gas, or steam. Acid gases are gases that contain predominantly carbon dioxide, hydrogen sulfide, or mixtures thereof and which form acidic solutions upon dissolution in water. Carbon dioxide ($CO_2$) and other acid gases are particularly attractive gas injectants because they are able to achieve miscibility with crude oil over a wide range of reservoir conditions. In addition, it is anticipated that the use of carbon dioxide in gas injection EOR will continue to increase in the future as incentives are put in place to store large quantities of carbon dioxide underground to reduce greenhouse gas emissions to the atmosphere. In addition, acid gas is also produced as an undesirable byproduct of oil or gas production from reservoirs containing fluids with concentrations of carbon dioxide and/or hydrogen sulfide. Using acid gas as an EOR injectant is one way to put this waste product to beneficial use.

The success of water and gas floods can be diminished by early breakthrough of the injected water and/or gas at production wells. A particularly serious problem is early breakthrough caused by channeling of the injectant through high-permeability pathways connecting certain injection wells to the "breakthrough" production wells. The pathways may consist of thin high-permeability layers or "thief zones," networks of higher-permeability rock, or systems of natural or induced fractures. Such channeling, or poor conformance, of the injected fluid can cause it to contact and sweep only a small portion of the reservoir volume, thus limiting the amount of oil recovered, causing inefficient utilization of the injected fluid, and limiting the ultimate storage efficiency of carbon dioxide or other acid gas. Channeling is a particular concern in heterogeneous carbonate formations.

Channeling can be further exacerbated by unfavorable mobility and density ratios between the injected and reservoir fluids, which cause the injected fluid to finger through the resident reservoir fluids and to gravity segregate in the reservoir. Fingering and gravity segregation are particular concerns in gas or WAG injection, because gases have higher mobility and lower density than oil or water.

A variety of remedial actions have been proposed to mitigate channeling problems. The rate of fluid production at the offending production well may be reduced or the well may be shut in periodically to limit production of the injected fluid. If the source injection well for the unwanted production can be identified, the rate of injection at that well can be reduced. Plugging substances such as cements, gels, polymers, foams, or combinations thereof may be placed in the high-permeability pathway to block flow and divert injected fluids into other less permeable regions of the reservoir.

However, the use of such plugging or blocking agents has had limited success in highly heterogeneous formations in which there is a wide range of permeability and the higher permeability portions of the rock are in good hydraulic communication with the lower permeability portions. In such cases, it has been found that although some of the injectant may be diverted into lower permeability rock, it rapidly finds its way back to the higher permeability rock, which provides the path of least resistance to flow. In addition, although the ratio of injectant to oil in the production stream may be temporarily reduced, often the rate of oil production drops as production from the more permeable portions of the formation is shut off.

SUMMARY OF THE INVENTION

In one embodiment of the present disclosure, a method for recovering oil from a subterranean, hydrocarbon-bearing formation includes at least one injection well and injecting a carrier fluid comprising a diverting agent into a high permeability pathway within the formation. An activating fluid is injected into the high permeability pathway within the formation, resulting in the precipitation or swelling of the diverting agent. The permeability of the high permeability pathway is decreased within the formation containing the diverting agent to a permeability less than the permeability of the adjacent areas of the formation. Other steps may include allowing the carrier fluid to have a predetermined residence time within the formation prior to the injection of an activating fluid; repeating the steps of injecting a carrier fluid comprising a diverting agent and injecting an activating fluid; and injecting a mineralization fluid that is either oversaturated or becoming oversaturated upon interacting with the acid gas and causing mineral precipitation to seal off high-permeability pathways. The activating fluid may be an acid gas, such as $CO_2$, that forms an aqueous solution in situ that is capable of dissolving at least a portion of the rock matrix making up the lower-permeability portions of the formation.

BRIEF DESCRIPTION OF THE DRAWINGS

The foregoing and other advantages of the present invention may become apparent upon reviewing the following detailed description and drawings of non-limiting examples of embodiments in which.

DETAILED DESCRIPTION

Figure 1:
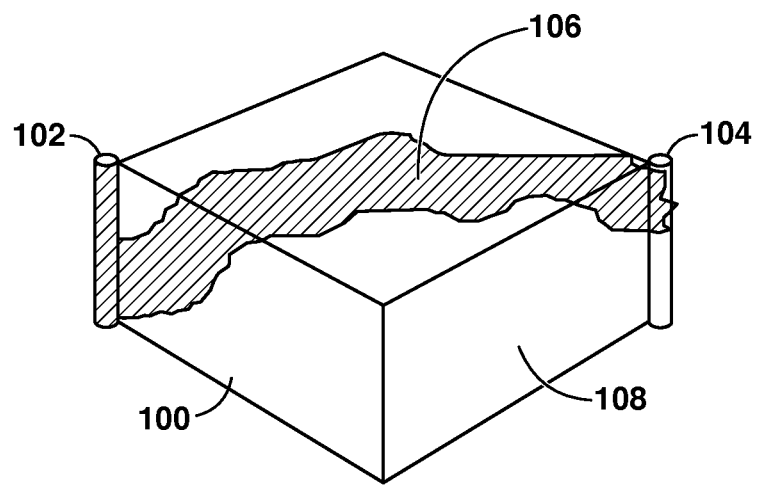
FIG. 1 is an illustration of a high permeability pathway within a subsurface formation.

In the following detailed description section, the specific embodiments of the present disclosure are described in connection with preferred embodiments. However, to the extent that the following description is specific to a particular embodiment or a particular use of the present disclosure, this is intended to be for exemplary purposes only and simply provides a description of the exemplary embodiments. Accordingly, the disclosure is not limited to the specific embodiments described below, but rather, it includes all alternatives, modifications, and equivalents falling within the true spirit and scope of the appended claims.

Definition

Various terms as used herein are defined below. To the extent a term used in a claim is not defined below, it should be given the broadest definition persons in the pertinent art have given that term as reflected in at least one printed publication or issued patent.

The terms "a" and "an," as used herein, mean one or more when applied to any feature in embodiments of the present inventions described in the specification and claims. The use of "a" and "an" does not limit the meaning to a single feature unless such a limit is specifically stated.

The term "about" is intended to allow some leeway in mathematical exactness to account for tolerances that are acceptable in the trade. Accordingly, any deviations upward or downward from the value modified by the term "about" in the range of 1% to 10% or less should be considered to be explicitly within the scope of the stated value.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The term "exemplary" is used exclusively herein to mean "serving as an example, instance, or illustration." Any embodiment described herein as "exemplary" is not necessarily to be construed as preferred or advantageous over other embodiments.

The term "formation" refers to a body of rock or other subsurface solids that is sufficiently distinctive and continuous that it can be mapped. A "formation" can be a body of rock of predominantly one type or a combination of types. A formation can contain one or more hydrocarbon-bearing zones. Note that the terms "formation," "reservoir," and "interval" may be used interchangeably, but will generally be used to denote progressively smaller subsurface regions, zones or volumes. More specifically, a "formation" will generally be the largest subsurface region, a "reservoir" will generally be a region within the "formation" and will generally be a hydrocarbon-bearing zone (a formation, reservoir, or interval having oil, gas, heavy oil, and any combination thereof), and an "interval" will generally refer to a sub-region or portion of a "reservoir."

The term "hydrocarbon-bearing zone," as used herein, means a portion of a formation that contains hydrocarbons. One hydrocarbon zone can be separated from another hydrocarbon-bearing zone by zones of lower permeability such as mudstones, shales, or shaley (highly compacted) sands. In one or more embodiments, a hydrocarbon-bearing zone includes heavy oil in addition to sand, clay, or other porous solids.

The terms "preferred" and "preferably" refer to embodiments of the inventions that afford certain benefits under certain circumstances. However, other embodiments may also be preferred, under the same or other circumstances. Furthermore, the recitation of one or more preferred embodiments does not imply that other embodiments are not useful, and is not intended to exclude other embodiments from the scope of the inventions.

The terms "substantial" or "substantially," as used herein, mean a relative amount of a material or characteristic that is sufficient to provide the intended effect. The exact degree of deviation allowable may in some cases depend on the specific context.

The definite article "the" preceding singular or plural nouns or noun phrases denotes a particular specified feature or particular specified features and may have a singular or plural connotation depending upon the context in which it is used.

Description of Embodiments

The success of water and gas floods can be diminished by early breakthrough of the injected water and/or gas at production wells. The fundamental issue that limits sweep efficiency is the high resistance to flow in the lower permeability portions of the rock combined with a large permeability contrast between high and low permeability. A particularly serious problem is early breakthrough caused by channeling of the injectant through high-permeability pathways connecting certain injection wells to the "breakthrough" production wells. An embodiment of the invention improves oil recovery processes by reducing the contrast between high and low permeability not only by increasing the resistance to flow in high permeability portions of the rock, but also by reducing the resistance to flow in low permeability portions of the rock.

Referring to FIG. 1, illustrated is a cross section of a heterogeneous reservoir 100 with an injection well 102 and a production well 104. A high permeability pathway 106 runs between injection well 102 and production well 104 through a lower permeability area 108. The pathways may consist of thin high-permeability layers or "thief zones," networks of higher-permeability rock, or systems of natural or induced fractures. Such channeling, or poor conformance, of the injected fluid can cause it to contact and sweep only a small portion of the reservoir volume, such as the volume present in the high permeability pathway 106, thus limiting the amount of oil recovered, causing inefficient utilization of the injected fluid, and limiting the ultimate storage efficiency of carbon dioxide or other acid gas. Channeling is a concern in reservoirs with heterogeneities which can lead to production problems as mentioned above, carbonate formations are just one example of reservoirs with heterogeneities.

An embodiment of this invention addresses the problem of poor sweep efficiency of injected $CO_2$ and other acid gases when injected into highly heterogeneous subsurface formations with wide ranging permeability, especially heterogeneous formations, for purposes of enhanced oil recovery (EOR) or storage.

An embodiment of this invention makes heterogeneous rock more homogeneous—it improves the sweep efficiency and storage capacity of $CO_2$ and other acid gases in heterogeneous reservoirs by selectively enhancing the porosity and permeability of low permeability rock through injection of acid gas. In addition, an embodiment of this invention decreases the permeability of high permeability pathways through the heterogeneous rock by the injection of a diverting agent into the high permeability pathways. The diverting agent may be a particle that will initially flow through high permeability pathways, but which may be activated to swell or precipitate within the high permeability pathways and thus decrease the permeability of the pathways.

Figure 2:
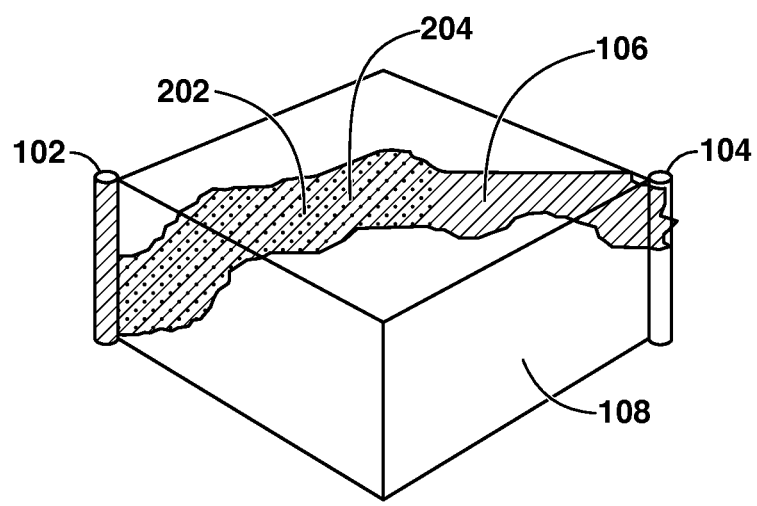
FIG. 2 is an illustration of the injection of a diverting agent into the high permeability pathway of FIG. 1, according to the present disclosure.

Referring to FIG. 2, in an embodiment, to mitigate channeling of injected gas or other fluids through high-permeability pathway 106, a diverting agent is used to block the high-permeability pathways, or at least decrease their permeability, away from the wellbore and direct the injected fluids into lower permeability rock 108. The diverting agent 202 is dispersed in water or other inexpensive carrier fluid 204 prior to injection. The carrier fluid 204 and diverting agent 202 are injected into the heterogeneous reservoir 100 through the injection well 102. In another embodiment (not shown), the carrier fluid 204 and diverting agent 202 are injected through the production well 104. Obviously, the injection of the carrier fluid and diverting agent may be performed in more than one well.

The diverting agent 202 may be a dispersion of nanoparticles that initially flow through the reservoir rock without significant retention or alteration of the permeability of the reservoir rock. The diverting agent 202 may then swell or precipitate in the presence of an activating agent, decreasing the permeability of the reservoir rock. The diverting agent 202 may be, for example, coal, clay, or polymer that may swell in the presence of dissolved gas in the carrier fluid or be, for example, colloidal silica that may precipitate in the presence of dissolved gas. A swellable polymer could be a polystyrene latex particle. A dispersing agent such as a surfactant may be included to prevent flocculation, coagulation, or precipitation of the nanoparticles and keep them uniformly dispersed within the carrier fluid. In an embodiment, an activating agent could be $CO_2$ or other acid gas.

Because the activating agent may already be present within the formation, often, for example, injection of $CO_2$ may have already taken place, the rate of swelling or precipitation of the diverting agent may need to be tailored to the reservoir conditions in order to provide blocking of the high-permeability pathways at the desired distance away from the wellbore and thus achieve deep diversion of the $CO_2$. The rate of swelling and/or precipitation is tailored by controlling particle composition, concentration, and size and concentration and/or injection rate of the activating agent. Optionally, a predetermined residence or soak time also may be used to allow the diverting agent to be placed at the desired location and then to swell. Other means of placing the diverting agent at a desired distance away from the wellbore include injecting the smallest diverting agents earlier in the injection process. For example, the average size of the diverting agents injected earlier in the injection process could be one tenth of the pore throat radius of the rock pores in the subterranean formation. Later in the injection process the average size of the diverting agents could be increased to one-fourth to one-half the pore throat radius of the rock pores in the subterranean formation.

Other methods include adjusting the concentration of the diverting agent within the carrier fluid. The diverting agent may be present with the carrier fluid at a concentration from about 100 to 10,000 ppm, or from about 500 to about 1500 ppm, or as appropriate to existing reservoir conditions. In order to place the diverting agent at a further distance away from the injection wellbore, the concentration may be reduced during the initial injection and increased during the course of the injection of the carrier fluid. The volume of the carrier fluid and the concentration of the diverting agent within the carrier fluid may be calculated and/or monitored to ensure that the desired volume of the high permeability pathway is properly occupied by the diverting agent.

Figure 3:
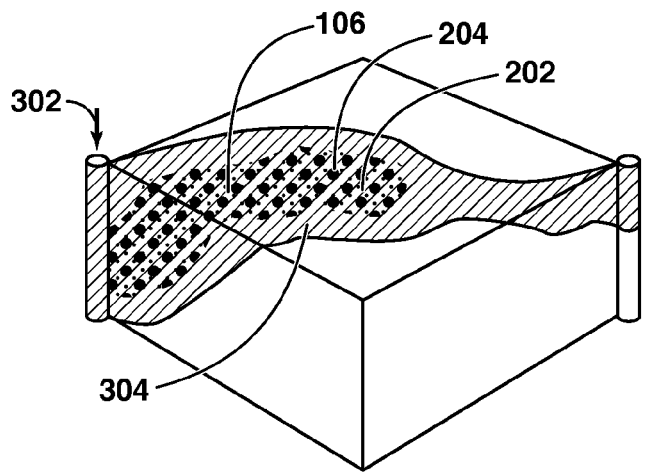
FIG. 3 is an illustration of the injection of an activating agent into the subsurface formation of FIGS. 1 and 2, according to the present disclosure.

Referring to FIG. 3, following the injection of the carrier fluid 204 and diverting agent 202, an activating agent 302 such as $CO_2$ is injected to cause the diverting agent to swell or precipitate. The swelling or precipitation of the diverting agent 202 will then decrease the permeability of the rock containing the diverting agent and cause the injected activating agent, in this embodiment $CO_2$, to cease or decrease its flow through the formerly high permeability pathway 106 and divert its flow into the surrounding areas 304 that were previously less permeable.

The permeability of the surrounding areas 304 will also be increased by the dissolution of the formation rock caused by the weak acid generated by the injected $CO_2$ or $CO_2$ plus additives in water, promoting better access and flow rate. Additives to the injected $CO_2$ such as $H_2S$, $SO_2$, catalyst, or water may be added to accelerate the rate of rock dissolution. The injected $CO_2$ will tend to flow preferentially through the new pathways, such as surrounding areas 304, created by preferential dissolution of the rock.

Once the surrounding area 304 is estimated to have been swept of oil from the $CO_2$ injection, another round of injection of diverting agent followed by injection of activating $CO_2$ may be conducted to successively block the paths of least resistance to flow and divert the $CO_2$ into an ever increasing volume of low-permeability rock.

As a final stage, a mineralization fluid that is either oversaturated or becoming oversaturated upon interacting with the $CO_2$ or other acid gas may be injected that causes mineral precipitation to seal off high-permeability pathways.

Figure 4:
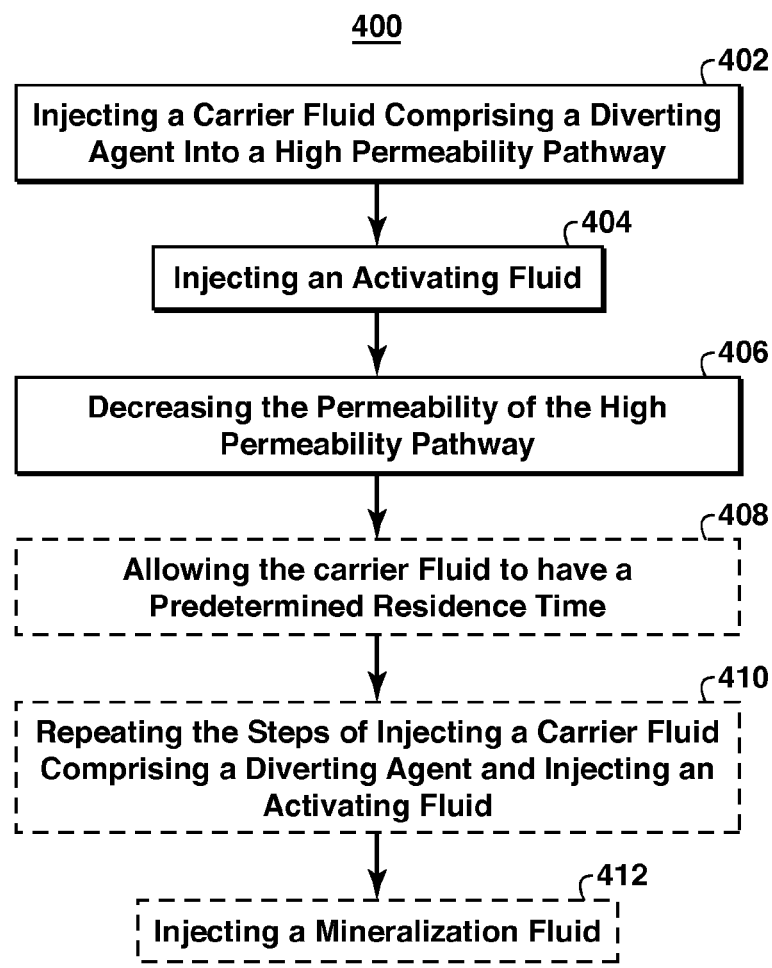
FIG. 4 is an illustration of a method of recovering oil from a subsurface, hydrocarbon bearing formation, according to the present disclosure.

Referring to FIG. 4, illustrated in flow-chart form is a method 400 for recovering oil from a subterranean, hydrocarbon-bearing formation comprising at least one injection well, the method comprising the step 402 of injecting a carrier fluid comprising a diverting agent into a high permeability pathway within the formation. In step 404, an activating fluid is injected into the high permeability pathway within the formation, resulting in the precipitation or swelling of the diverting agent. Step 406 comprises decreasing the permeability of the high permeability pathway within the formation containing the diverting agent to a permeability less than the permeability of the adjacent areas of the formation. Other steps may include allowing the carrier fluid to have a predetermined residence time within the formation prior 408 to the injection of an activating fluid; repeating the steps of injecting a carrier fluid comprising a diverting agent and injecting an activating fluid 410; and injecting a mineralization fluid 412 to accelerate the rate of acid gas induced mineral precipitation to seal off high-permeability pathways. The activating fluid may be an acid gas, such as $CO_2$, that forms an aqueous solution in situ that is capable of dissolving at least a portion of the rock matrix making up the lower-permeability portions of the formation.

Figure 5:
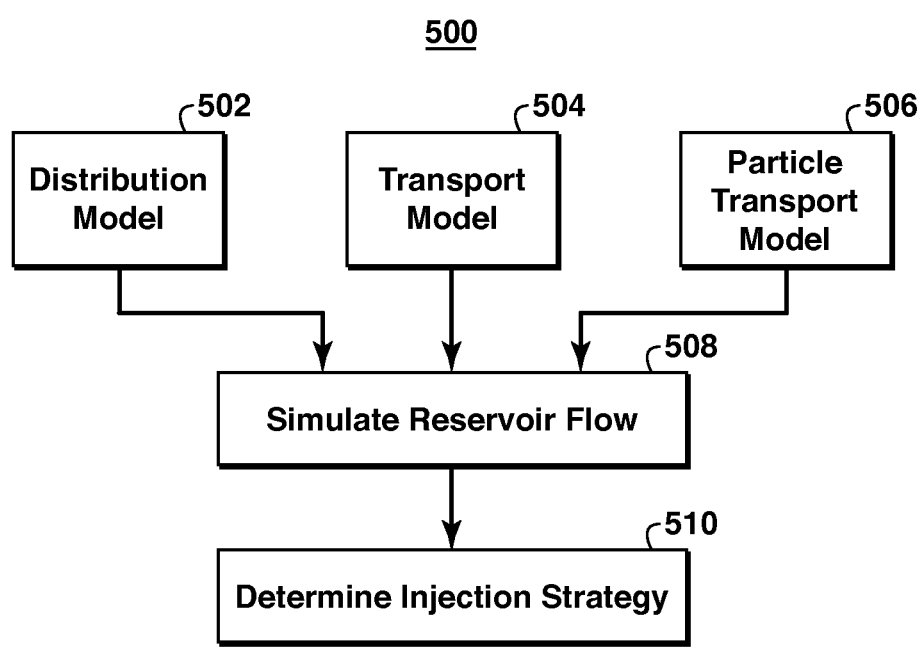
FIG. 5 is an illustration of an exemplary embodiment of a reservoir simulation model to design the method of FIG. 4.

Referring to FIG. 5, according to an aspect of the disclosed methodologies and techniques, a reservoir simulation model 500 is disclosed that incorporates the following features that may be used to design the process or injection strategy for a particular reservoir. A distribution model 502 provides a representation of the heterogeneous distribution of porosity and/or permeability within the target subsurface formation. A reactive transport model 504 accounting for chemical reactions between the injected acid gas and the rock, and how they affect the porosity and permeability of the rock. A nanoparticle transport model 506 provides how the swelling, precipitation, and/or retention of the nanoparticles within the porous medium affects the porosity and permeability of the rock. These three models would all receive various inputs from the user of the reservoir simulation model 500. The output from the three models would be received and used to simulate the reservoir flow 508. The simulation of the reservoir flow 508 would then be used to determine the injection strategy 510.

While the present disclosure may be susceptible to various modifications and alternative forms, the exemplary embodiments discussed above have been shown only by way of example. However, it should again be understood that the disclosure is not intended to be limited to the particular embodiments disclosed herein. Indeed, the present disclosure includes all alternatives, modifications, and equivalents falling within the true spirit and scope of the appended claims.

What is claimed is:

1. A method for recovering oil from a subterranean, hydrocarbon-bearing formation comprising at least one injection well, the method comprising:
    injecting a carrier fluid comprising a diverting agent into a high permeability pathway within the formation;
    injecting an activating fluid and additives into the high permeability pathway within the formation, wherein the activating fluid results in the precipitation or swelling of the diverting agent; and
    decreasing the permeability of the high permeability pathway within the formation containing the diverting agent to a permeability less than the permeability of the adjacent areas of the formation;
    wherein the activating fluid at least partially dissolves some of the formation, and the additives accelerate the rate of dissolution of the formation.

2. The method of claim 1, wherein the diverting agent is a polymer.

3. The method of claim 1, wherein the diverting agent is a clay.

4. The method of claim 1, wherein the diverting agent is a coal.

5. The method of claim 1, wherein the diverting agent is colloidal silica.

6. The method of claim 1, wherein injecting a carrier fluid comprising a diverting agent comprises injecting a predetermined volume of carrier fluid.

7. The method of claim 1, wherein the average size of the diverting agent increases during the injection of the carrier fluid.

8. The method of claim 1, wherein the diverting agent precipitates during injection of the activating fluid.

9. The method of claim 1, further comprising allowing the carrier fluid to have a predetermined residence time within the formation prior to the injecting an activating fluid.

10. The method of claim 1, wherein the diverting agent comprises a rate of swelling or precipitation to allow the diverting agent to reach a desired distance away from the wellbore before plugging the formation.

11. The method of claim 1, wherein the activating fluid comprises an acid gas.

12. The method of claim 11, wherein the acid gas comprises $CO_2$.

13. The method of claim 11, wherein the acid gas comprises $H_2S$.

14. The method of claim 1, further comprising repeating the steps of injecting a carrier fluid comprising a diverting agent and injecting an activating fluid.

15. The method of claim 1, further comprising injecting a mineralization fluid to accelerate the rate of acid gas induced mineral precipitation to seal off high-permeability pathways.

16. The method of claim 15, wherein the mineralization fluid is either oversaturated or becoming oversaturated upon interacting with acid gas.

17. A reservoir simulation model to design the method of claim 1, the simulation model comprising:
    a representation of the heterogeneous distribution of porosity and permeability within the subterranean formation;
    a reactive transport model accounting for chemical reactions between the injected activating fluid and the subterranean formation and how the reactions affect porosity and permeability; and
    a model of diverting agent transport, swelling, precipitation, and retention within the porous medium and how these phenomena affect porosity and permeability.

* * * * *